United States Patent
Winckler et al.

Patent Number: 6,132,877
Date of Patent: Oct. 17, 2000

[54] HIGH DENSITY, LOW POROSITY, CARBON COMPOSITE CLUTCH MATERIAL

[75] Inventors: Peter Stanhope Winckler, Ann Arbor; Greg Alan Weeter, Ypsilanti, both of Mich.

[73] Assignee: General Motors Corporation, Detroit, Mich.

[21] Appl. No.: 09/265,060

[22] Filed: Mar. 9, 1999

[51] Int. Cl.[7] .................................................... B32B 9/00
[52] U.S. Cl. ........................ 428/408; 428/107; 428/111; 428/137; 428/196; 428/212; 428/366; 428/367; 428/395; 428/907
[58] Field of Search .................................. 428/408, 111, 428/107, 137, 196, 212, 366, 367, 395, 902; 442/64

[56] References Cited

U.S. PATENT DOCUMENTS

| | | | |
|---|---|---|---|
| 4,291,794 | 9/1981 | Bauer | 192/107 M |
| 4,700,823 | 10/1987 | Winckler | 192/107 M |
| 4,828,089 | 5/1989 | Collins et al. | 192/70.12 |
| 4,844,218 | 7/1989 | Genise | 192/53 F |
| 5,033,596 | 7/1991 | Genise | 192/53 F |
| 5,221,401 | 6/1993 | Genise | 156/293 |
| 5,643,663 | 7/1997 | Bommier et al. | 428/317.9 |

FOREIGN PATENT DOCUMENTS

WO 98/00575  1/1998  WIPO.

*Primary Examiner*—Rich Weisberger
*Attorney, Agent, or Firm*—George A. Grove

[57] ABSTRACT

A carbon—carbon composite clutch friction material for use with a wet lubricant under severe operating conditions is disclosed, the material comprising a woven carbon fabric mesh (suitably a satin weave mesh) infiltrated with pyrolytic carbon to an unusually high density in the range of at least 1.3 g/cc to about 1.5 g/cc. By infiltrating the woven carbon fabric with carbon to such high density, a wear-resistant friction material is provided that still retains enough surface texture for lubricant transport.

5 Claims, 2 Drawing Sheets

HIGH DENSITY, LOW POROSITY, CARBON COMPOSITE CLUTCH MATERIAL

TECHNICAL FIELD

This invention pertains to automotive clutches. More particularly, this invention relates to carbon composite friction materials for heavy duty and continuous slip, wet lubricant clutch applications.

BACKGROUND OF THE INVENTION

Carbon-carbon composite clutch friction materials for clutch plates operating in a liquid lubricant (sometimes called "wet") environment have gained acceptance over the past 20 years. Woven fabrics of carbonized or graphitized polyacrylonitrile (PAN) or rayon fibers have been used as a substrate for infiltration with more carbon. The woven carbon fabric, often a plain or square weave pattern, provides a flexible, open mesh or open porosity precursor for a carefully controlled amount of infiltration with carbon to produce a composite product still having suitable porosity and flexibility for clutch operation in a liquid lubricant. The carbon infiltrated, carbon fabric is then glued to a steel disk or plate, often in the shape of a ring, to complete the clutch plate.

In the manufacture of the composite, one or two layers of the woven carbon fiber fabric are subjected to a carbon infiltration process. Sometimes the fabric is infiltrated with a carbonizable thermosetting resin and heated in a furnace under a suitable atmosphere to carbonize the resin. Generally, the fabric is placed in a furnace and the furnace is evacuated of air and heated to 1900° F. or so. A carbonaceous gas, typically natural gas or methane, is flowed around the fabric. The gas decomposes to deposit carbon (pyrolytic carbon) in the fabric. This is the chemical vapor deposition (CVD) process. The carbon infiltration process is continued or repeated until a composite of specified density and porosity is obtained. The friction surface of the composite is usually machined with a surface grinder to remove high spots from the infiltrated fabric.

Heretofore, composites for clutch applications have had a density of about 0.7 to 1.2 grams per cubic centimeter (g/cc). This density range has provided suitable open porosity for infiltration by the wet lubricant and for adhesive infiltration at one side for bonding the composite fabric to a metal plate or disk. For example, Bauer, U.S. Pat. No. 4,291,794, describes clutch materials exhibiting open porosity of 15% to 85% in composite sheets of about 0.030 to 0.033 inch thickness and weight per unit area of 350 to 800 gms/square meter. Thus, the composite sheets had a density of about 0.4 to 1.0 g/cc.

Winckler, U.S. Pat. No. 4,700,823, describes carbon composite clutch friction material produced in the same way. The composite product had open porosity with the original texture of the precursor carbon fabric still being present following carbon deposition by CVD. The patent specification does not disclose density figures, but the Examiner was told during prosecution of the application that materials having bulk densities of 0.7 to 1.2 g/cc provided the advantages of the Winckler invention while providing the required open porosity. A later patent to Collins and Winckler, U.S. Pat. No. 4,828,089, affirmed a preferred bulk density of 0.7 to 1.2 g/cc for this wet lubricated pyrolytic carbon composite friction material.

A group of patents to Genise, U.S. Pat. Nos. 4,844,218, 5,033,596 and 5,221,401, describe applications for substantially the same porous CVD carbon-carbon fiber composites as suitably having a density range of 0.3 to 1.3 g/cc with an optimum range of 0.7 to 1.1 g/cc. Thus, the pyrolytic carbon infiltrated carbon fiber composites for wet clutch applications have all been specified to require the flexibility and open porosity afforded by densities below 1.3 g/cc and preferably below 1.1 g/cc.

Clutch applications have now been encountered in which the above-described low density composite materials have not worked. For example, a torque converter design has involved especially high unit loadings on the clutch and high rate continuous slip operation. The above, now standard, friction materials have not displayed the durability or friction level stability required for such demanding applications. A new, more robust material is required if the use of expensive sintered powder metal or flame sprayed friction materials is to be avoided.

SUMMARY OF THE INVENTION

This invention provides a robust, carbon vapor deposition-infiltrated woven carbon fabric composite friction material useful in wet lubricated clutches. This friction material is particularly useful in heavy duty applications, such as in the automotive field, requiring high density energy transmission of torque and/or the transmission of torque under continuous slip at high revolutions per minute, e.g., up to about 200 rpm. In accordance with the invention, the composite is formed to a suitable, narrow range, high density (for clutch friction materials) that provides excellent wear resistance with stable friction properties. However, the density of the composite is critically balanced so that a suitable surface texture is obtained for good friction characteristics, and the transport of a relatively small but controlled amount of lubricant across the surface is accommodated.

This carbon—carbon composite friction material comprises a substantially closed mesh, woven carbon fiber fabric substrate. The fabric is suitably of satin weave, e.g., a five- to eight-harness pattern where each filler fiber passes over and under four to seven fibers. Such woven pattern provides an excellent friction surface texture for a clutch plate. Suitably, a single layer of the woven fabric, depending upon the design clutch plate thickness, is progressively infiltrated by chemical vapor deposition (CVD) of natural gas or the like. The deposition is controlled to achieve an apparent composite density of at least 1.3 grams per cubic centimeter (g/cc) up to about 1.5 g/cc. The resultant composite material is rigid and has little porosity with some definite residual friction surface texture that is characteristic both of the initial woven fabric and the resultant high density.

The friction surface texture of the subject high density composites provides a particular advantage in controlling the flow of lubricant over the surface. Very little transmission fluid flows through the thickness of the composite material, but a small steady flow of the cooling liquid flows radially (for example) over the hill and valley texture of the surface resulting from the woven fabric and the bulk density of the composite. Lower density composites (<1.3 g/cc) permit an uncontrolled flood of the lubricant while higher density composites (substantially greater than 1.5 g/cc) are relatively smooth and permit no flow between the clutch surface and its counter surface.

It is recognized that the provision of such a high density carbon composite friction material for wet lubricated applications is contrary to past practices. Nevertheless, it was discovered that, e.g., in a 245 mm diameter automotive torque converter, a steel clutch plate carrying such an adhesively bonded carbon composite layer (with four radial slots in the composite surface for lubricant transport) enabled continuous slip operation at levels up to 80 to 200 rpm. And the durability of the very rigid, high density, substantially non-porous friction material was sufficient for commercial applications.

In addition to torque converter clutch applications, the high density carbon composites of this invention will find application in other wet lubricated environments such as shifting clutches in differentials and in automatic transmission gear clutches.

Other objects and advantages of this invention will become apparent from a detailed description of a preferred embodiment which follows. In such description, reference will be had to the drawings which are described in the following section.

DESCRIPTION OF THE PREFERRED EMBODIMENT

The practice of the invention will be described in the environment of a 245 millimeter diameter torque converter requiring continuous slip operation at levels up to 200 rpm and 150 foot-pounds torque. But the invention can also be used in other clutch applications, such as transmission clutches or shifting clutches in differentials or the like, where like demanding properties are required.

Figure 1:
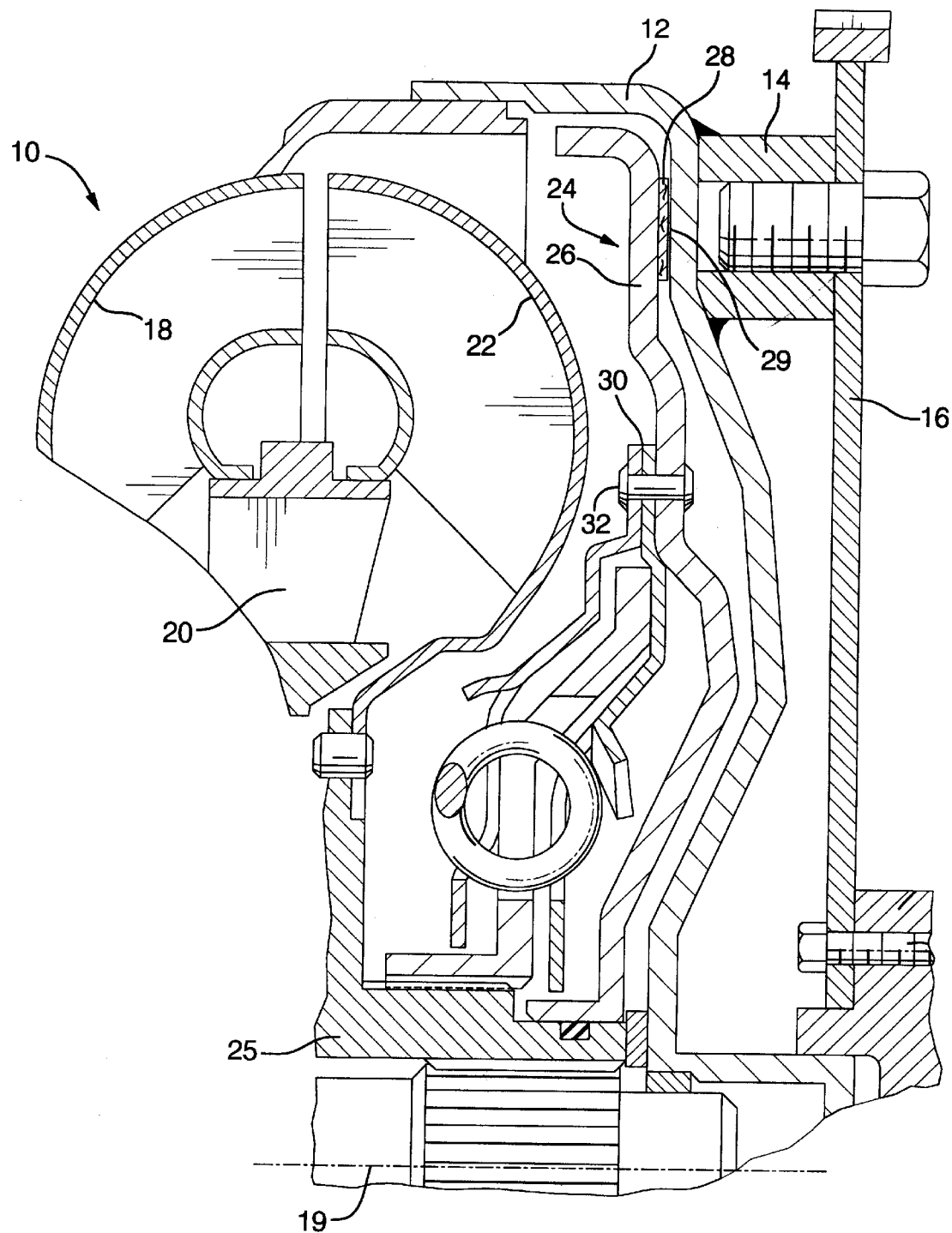
FIG. 1 is a schematic sectional view of a portion of a torque converter showing the converter clutch assembly engaging the torque converter housing.

FIG. 1 is a sectional view of a portion of a torque converter 10. A torque converter is the primary component for transmittal of power between a vehicle engine and its transaxle. The converter housing cover assembly 12 is bolted at weld lug 14 to the engine flexplate 16 so that the converter housing will rotate at engine speed. In brief, the converter comprises a pump assembly 18, a stator assembly 20, a turbine section 22 and torque converter clutch assembly 24. Pump assembly 18 is attached (not shown) to pump quill shaft 19. The turbine section 22 and clutch assembly 24 are attached to primary torque output shaft 25.

The function and structure of torque converters is known and need not be repeated here in detail. However, for the purpose of appreciating the advantages of the invention, one must remember that the converter provides for a smooth conversion of torque from the engine to the components of the transaxle and provides a direct drive from the engine to the transaxle through the use of a torque converter clutch.

Torque converter clutch plate assembly 24 when forced into engagement with a smooth machined counter surface 29 on housing 12 provides the direct drive. However, some converter designs provide for occasional or constant slip between clutch 24 and surface 29 of housing 12. If slip rates exceed about 20 rpm under appreciable pressure, conventional friction materials, described in the background section above, fail.

Figure 2:
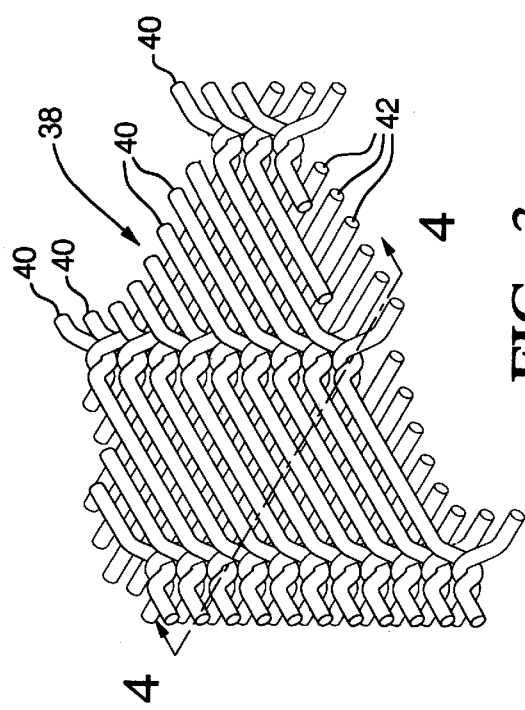
FIG. 2 is a perspective view of a torque converter clutch plate assembly having a composite friction material in accordance with this invention.

Torque converter clutch plate assembly 24 is shown in perspective view in FIG. 2. Clutch assembly 24 comprises friction material carrying plate 26 with an annular band of friction material 28. Plate 26 is attached to back plate 30 with rivets 32. It is the friction material 28 that is in continuous sliding contact with surface 29 of steel housing 12. A hydrocarbon base fluid (not shown) is employed to force the clutch assembly 24 into engagement with housing 12. And, in the operation of the converter, the fluid is slowly pumped in a radially inward direction across the face of the band of friction material through four radial slots 34 as well as across the friction surface 36 of the friction material itself. The flow over the textured surface 36 is critical as will be explained below.

Figure 3:
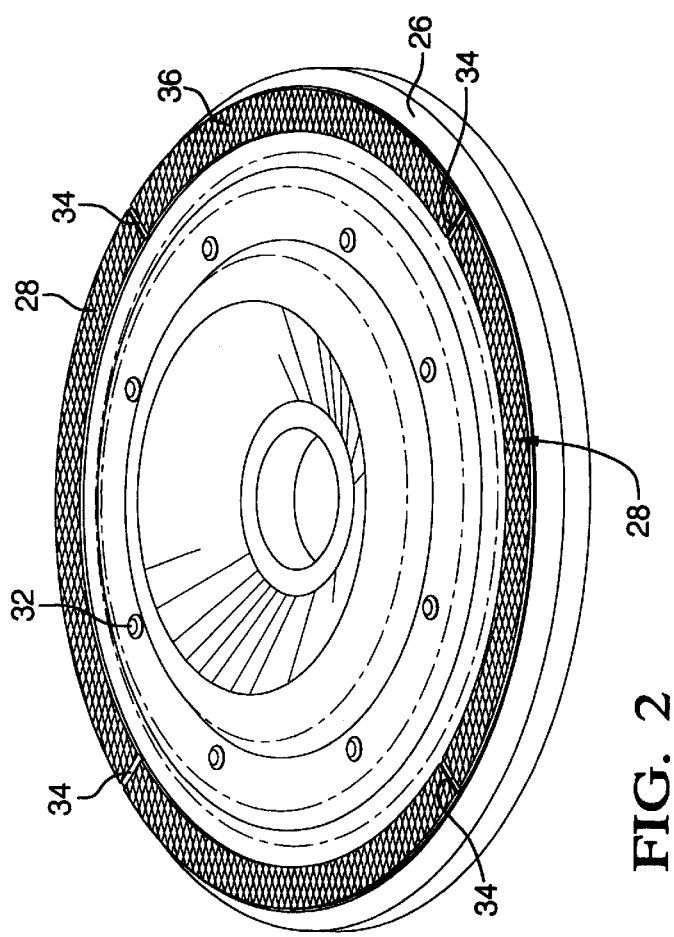
FIG. 3 is a greatly enlarged schematic view of a portion of the friction material surface of the clutch depicted in FIG. 2 showing the texture of the material.
Figure 4:
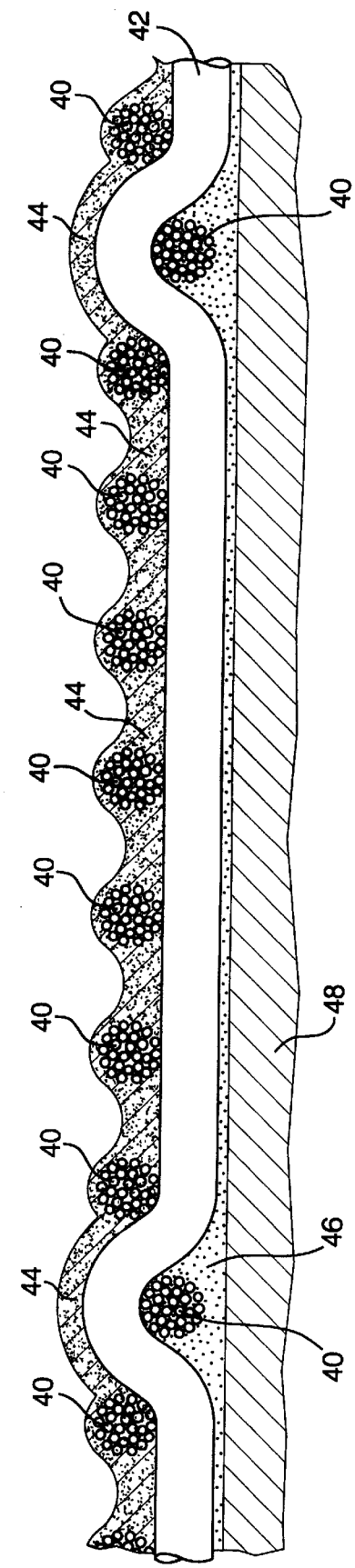
FIG. 4 is sectional view taken at section 4—4 of FIG. 3 showing the composite friction material of this invention and underlying steel plate.

In this example, friction material 28 comprises a single woven fabric 38 substrate layer (see FIGS. 3 and 4) formed of fibers 40, 42 of twisted carbon filaments. The fabric 38 is formed of graphitized PAN fibers that are woven in an eight harness satin weave. That is, the friction surface face 36 of the woven fabric consists predominately of filler fibers 40 because they each pass repeatedly over seven warp fibers 42 and under one warp fiber 42 at right angles as shown in FIGS. 3 and 4. The eight harness weave is a loose mesh-like weave and preferably has a thickness of 0.015 to 0.030 inches (0.38 to 0.77 mm). Carbon particles indicated at 44 are deposited by chemical vapor deposition on the fibers 40 and 42. The deposited carbon 44 fills in spaces (not shown) between filaments of the fibers 40 and 42 as well as gaps between the fibers.

The schematic representation of FIG. 3 is, of course, greatly enlarged to show the woven pattern. In the finished composite of carbonized carbon fabric there remains some microporosity but the nature of the material is that little if any lubricating oil can flow through or within the composite layer. However, the oil can flow along the surface 36 of the composite 28 and through the slots 34.

The composite friction material is bonded with an adhesive 46 to the steel plate 48 as illustrated in FIG. 4.

The control of lubricant flow over the composite friction material is achieved by considering flow permitted by the texture of the surface 36 of the composite material and adding slots 34 as determined necessary to achieve a desired flow rate. For example, in this specific 245 mm diameter torque converter design, the outside diameter of the band of friction material was 114 mm and the inside diameter of the band was 98 mm. The material had a bulk density of 1.36 g/cc. The surface texture resulting from the eight harness weave and the resulting density permitted a transmission fluid flow rate of 0.2 to 0.75 liters per minute over the operating range of the converter. This flow rate, coupled with the flow permitted through slots 34, was suitable for the high unit clutch load and high slip rate of the converter.

As stated, it is found that the bulk density of the composite in combination with the fabric weave is critical in achieving suitable lubricant flow over the friction surface of the composite. At composite densities lower than 1.3 g/cc, the flow rate is too high and uncontrollable. At densities much above 1.5 g/cc, the surface is too smooth and there is insufficient texture for flow between the clutch and its counter surface.

In this example, four radial slot were employed for lubricant flow. Obviously, that number can vary from application to application. However, in view of the flow characteristics of the subject friction material, it is expected that no more than about eight slots will be required in most situations. Also, radial slots will not always be used as the slots can be formed in a square or rectangular pattern.

In this torque converter application, it is preferred to use a five harness to eight harness satin weave as the substrate material. The configuration of these satin weave carbon fabrics appears to permit the achievement of the desired density range (>1.3 to 1.5 g/cc) in the composite friction material. The satin weave also provides a texture in the specified density composite product that permits oil flow over the friction surface during the continuous slip operation of the clutch.

In the operation of this continuous slip torque converter, CVD carbon-satin weave carbon fabric friction materials of varying densities have been evaluated. Such composites having densities of 1.36, 1.4 and 1.49 g/cc performed as required. The woven patterns plus the density of the composites (before bonding to the steel plates) produced surface textures that worked. The materials were durable and provided stable friction during continuous slip. On the other hand, like composite materials having densities of 1.1 and 1.6 g/cc were unsuitable.

It is presumed that woven fabrics other than the described five to eight harness satin weaves when infiltrated to a bulk composite density over 1.3 g/cc to about 1.5 g/cc will perform in such challenging clutch applications.

While this invention has been described in terms of some specific embodiments, it will be appreciated that other forms can readily be adapted by one skilled in the art. Accordingly, the scope of this invention is to be considered limited only by the following claims.

What is claimed is:

1. A low porosity, composite, clutch friction material for use in a wet lubricant, said composite material comprising a woven cloth mesh substrate having a textured surface, the cloth mesh and textured surface being infiltrated solely with chemical vapor deposited carbon to form a composite material having a friction surface and a density in the range of at least 1.3 grams per cubic centimeter to about 1.5 grams per cubic centimeter, said composite having a low porosity and a friction surface texture, both resulting from and characteristic of the infiltration of said cloth mesh to said composite density, such that in a wet lubricant the principal transport of said lubricant is across the textured friction surface rather than through pores in said composite.

2. A composite, clutch friction material as recited in claim 1 in which said woven cloth substrate is a satin weave fabric.

3. A composite, clutch friction material as recited in claim 1 in which said woven cloth substrate is a satin weave fabric of a pattern of from five harness to eight harness.

4. A composite clutch material as recited in any of claims 1 through 3 comprising up to eight slots in the friction surface of the material for transport of said lubricant.

5. A composite clutch material as recited in any of claims 1 through 3 comprising up to eight radial slots in the friction surface of the material for transport of said lubricant.

* * * * *